(12) United States Patent
Lanier

(10) Patent No.: US 11,418,760 B1
(45) Date of Patent: Aug. 16, 2022

(54) VISUAL INDICATORS FOR PROVIDING USER AWARENESS OF INDEPENDENT ACTIVITY OF PARTICIPANTS OF A COMMUNICATION SESSION

(71) Applicant: MICROSOFT TECHNOLOGY LICENSING, LLC, Redmond, WA (US)

(72) Inventor: Jaron Lanier, Berkeley, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/163,344

(22) Filed: Jan. 29, 2021

(51) Int. Cl.
*H04N 7/15* (2006.01)
*H04L 12/18* (2006.01)
*G06F 3/01* (2006.01)

(52) U.S. Cl.
CPC ............ *H04N 7/157* (2013.01); *G06F 3/013* (2013.01); *H04L 12/1822* (2013.01)

(58) Field of Classification Search
CPC . H04M 15/00; H04N 21/2668; H04N 19/114; H04N 19/46; H04N 19/61; H04N 21/23418; H04N 21/4728; H04N 21/8133; H04N 21/858; H04N 21/42202; H04N 21/44218; H04N 21/812
USPC ....................................................... 348/14.02
See application file for complete search history.

(56) References Cited

U.S. PATENT DOCUMENTS

| | | |
|---|---|---|
| 6,519,639 B1 | 2/2003 | Glasser et al. |
| 8,006,182 B2 | 8/2011 | Bates et al. |
| 9,223,464 B2 | 12/2015 | Mandre |
| 9,332,227 B2 | 5/2016 | Cunico et al. |

(Continued)

FOREIGN PATENT DOCUMENTS

WO  2015067009 A1  5/2015

OTHER PUBLICATIONS

Anzar, Khalid, "Microsoft Teams gets together mode, dynamic view, other features: Know more", Retrieved from: https://www.business-standard.com/article/technology/microsoft-teams-gets-together-mode-dynamic-view-other-features-know-more-120070900668_1.html, Jul. 9, 2020, 7 Pages.

(Continued)

*Primary Examiner* — Maria El-Zoobi
(74) *Attorney, Agent, or Firm* — Scott Y. Shigeta; Newport IP, LLC

(57) ABSTRACT

The present disclosure provides systems that display visual indicators that provide user awareness of independent activity of participants in a communication session. The visual indicators are displayed within a Together Mode user interface that gives participants of a communication session a feeling that they are in the same room. The visual indicators further the technical benefits of the Together Mode user interface by providing additional context to particular nonverbal social cues. A system can generate a visual indicator that notifies meeting participants that a particular user is engaged with a computing device. The visual indicator can be generated in response to detecting that the user is interacting with an input device, such as a keyboard or touchscreen. The visual indicator mitigates confusion of nonverbal social cues, e.g., when a person appears to be looking (Continued)

at another participant of a meeting but is actually looking at, and interacting with, a computer.

20 Claims, 11 Drawing Sheets

(56) References Cited

U.S. PATENT DOCUMENTS

| | | | |
|---|---|---|---|
| 9,398,262 | B2 | 7/2016 | Li et al. |
| 9,900,555 | B1* | 2/2018 | Barreto ................... H04S 7/304 |
| 10,609,332 | B1 | 3/2020 | Turbell et al. |
| 10,757,367 | B1 | 8/2020 | Peters et al. |
| 2011/0025819 | A1 | 2/2011 | Gorzynski et al. |
| 2011/0029893 | A1* | 2/2011 | Roberts ................ G06Q 10/10 715/753 |
| 2014/0123030 | A1 | 5/2014 | Kozloski et al. |
| 2014/0184550 | A1 | 7/2014 | Hennessey et al. |
| 2015/0312520 | A1 | 10/2015 | Nohria et al. |
| 2016/0134840 | A1 | 5/2016 | Mcculloch |
| 2017/0310934 | A1 | 10/2017 | Du et al. |
| 2018/0124002 | A1 | 5/2018 | Baker et al. |
| 2019/0028413 | A1* | 1/2019 | Lewis ..................... H04L 67/22 |
| 2020/0302812 | A1 | 9/2020 | Williams et al. |

OTHER PUBLICATIONS

Holmqvist, et al., "Combining keystroke logging with eye tracking", In Journal of Writing and digital media, Apr. 1, 2006, pp. 1-7.

Steptoe, et al., "Eye-Tracking for Avatar Eye-Gaze and Interactional Analysis in Immersive Collaborative Virtual Environments", In Proceedings of the ACM Conference on Computer Supported Cooperative Work, Nov. 2008, pp. 197-200.

"International Search Report & Written Opinion issued in PCT Application No. PCT/US21/064768", dated Apr. 11, 2022, 17 Pages.

* cited by examiner

VISUAL INDICATORS FOR PROVIDING USER AWARENESS OF INDEPENDENT ACTIVITY OF PARTICIPANTS OF A COMMUNICATION SESSION

BACKGROUND

There are a number of communication systems that allow users to collaborate. For example, some systems allow people to collaborate using live video streams, live audio streams, and other forms of text-based or image-based mediums. Participants of a communication session can share a video stream that is displayed with a group of people. In some existing systems, user interface arrangements may show the live video streams in a grid format.

Although there are a number of systems that allow users to collaborate and share video streams, such systems still have a number of shortcomings. For instance, systems that display video streams in a traditional grid format make it difficult for participants to interpret many non-verbal social cues during a video conference meeting. It has been proven that non-verbal social cues are used by participants during in-person meetings to guide various types of interactions. For example, in an in-person meeting, people are constantly interpreting others' eye movements, posture, how their heads are tilted and more, and attributing meaning to those non-verbal cues. Researchers have called these interactions an intricate dance where, for instance, one person would turn their head and the other person might respond and lean back. But on a video call using a traditional grid user interface arrangement, those movements aren't diagnostic, meaning they're not providing accurate information about what's going on. One person might look at another for a response, but since everyone is organized differently on each participant's screen in a grid view, it's not clear to anyone else whom they're actually looking at.

Participants watching a video conference displayed in a grid format have to focus continuously on a screen to extract relevant information to stay engaged. Each person may have to expend a great deal of energy looking for non-verbal social cues, which can create a heavy cognitive load for each participant. Such shortcomings of existing systems can lead to user fatigue. This issue may be exacerbated when a user interface displays a large number of participants.

In another example, some video conference systems may not display participants at an optimal size. During a meeting, a presenter may be displayed in a rendering that is much larger than other participants. In such scenarios, when a person's face looms large in another person's visual sphere, it generally causes a person to trigger a fight or flight response. In this state, when that person is alert and hyper-aware, that causes amplified reactions that are automatic and subconscious, and that person's heart rate goes up. Thus, in such user interface arrangements, a user experience can be overwhelming for a person's nervous system to handle, which can further contribute to user fatigue.

These shortcomings, and others, can also lead to less than optimal interactions between a computing device and a user. In addition, such shortcomings of existing systems can lead to a loss in user engagement. Computing devices that do not promote user engagement, or worse, contribute to a loss of user engagement, can lead to production loss and inefficiencies with respect to a number computing resources. For instance, when a user becomes fatigued or disengaged, that user may need to refer to recordings or other resources when content that is shared in a live meeting is missed or overlooked. Content may need to be re-sent when viewers miss salient points or cues during a live meeting. Viewers may also have to utilize recorded versions of a meeting and computing resources to re-watch content when they miss salient points or miss non-verbal social cues during a meeting. Such activities can lead to inefficient use of a network, processor, memory, or other computing resources. In view of the forgoing and other reasons, there is an ongoing need for improvements to help make the user experience of video conference systems more like an in-person meeting and more engaging.

SUMMARY

The above deficiencies and other problems associated with video conference systems are reduced or eliminated by the introduction of visual indicators that provide user awareness of independent activity of participants in a communication session. The visual indicators are displayed within a Together Mode user interface that gives participants of a communication session a feeling that they are in the same room. As described in more detail below, the Together Mode user interface allows users to readily communicate non-verbal social cues during a live video communication session. The visual indicators further the technical benefits of the Together Mode user interface by providing additional context to particular non-verbal social cues.

In some embodiments, a Together Mode user interface positions renderings of meeting participants with an arrangement that allows users to see each other through a large virtual mirror. A system can generate a visual indicator that notifies meeting participants that a particular user is engaged with a personal computing device. The visual indicator can be generated in response to detecting that the user is interacting with an input device, such as a keyboard or touchscreen. Thus, when a user is looking down at their computer and typing on a keyboard, the system may generate a visual indicator that provides a notification to participants positioned below the user in the virtual mirror. The visual indicator can be graphically configured to indicate that the user is interacting with a computing device and not looking in the direction of the participants positioned below the user. This type of visual indicator can help mitigate confusion with respect to some non-verbal social cues, e.g., when a meeting participant appears to be looking at another participant of a meeting but is actually looking at, and interacting with, a computing device.

The visual indicator can be any type of computer-generated graphic suitable for indicating a user's interaction with a computing device. In some configurations, the visual indicator can be in the form of light that appears to be emanating from a location of a personal computing device. The visual indicator can be a faint glow that stimulates a lighted keyboard or a mobile device. Such embodiments can be subtle enough that it does not disrupt the flow of a meeting, yet configured in a way that makes a user's intensions more clear as they are interacting with a computer and not interacting with other participants.

In some embodiments, a system can utilize one or more sensors to determine a user's eye gaze direction. The system can generate a visual indicator in response to detecting that the user is looking in a predetermined direction, e.g., looking down at their computing device. By generating a visual indicator based on sensor data indicating the user's eye gaze direction and/or the input data from the user's input device, a system can provide another level of accuracy when generating visual indicators conveying context to a user's non-verbal social cues.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
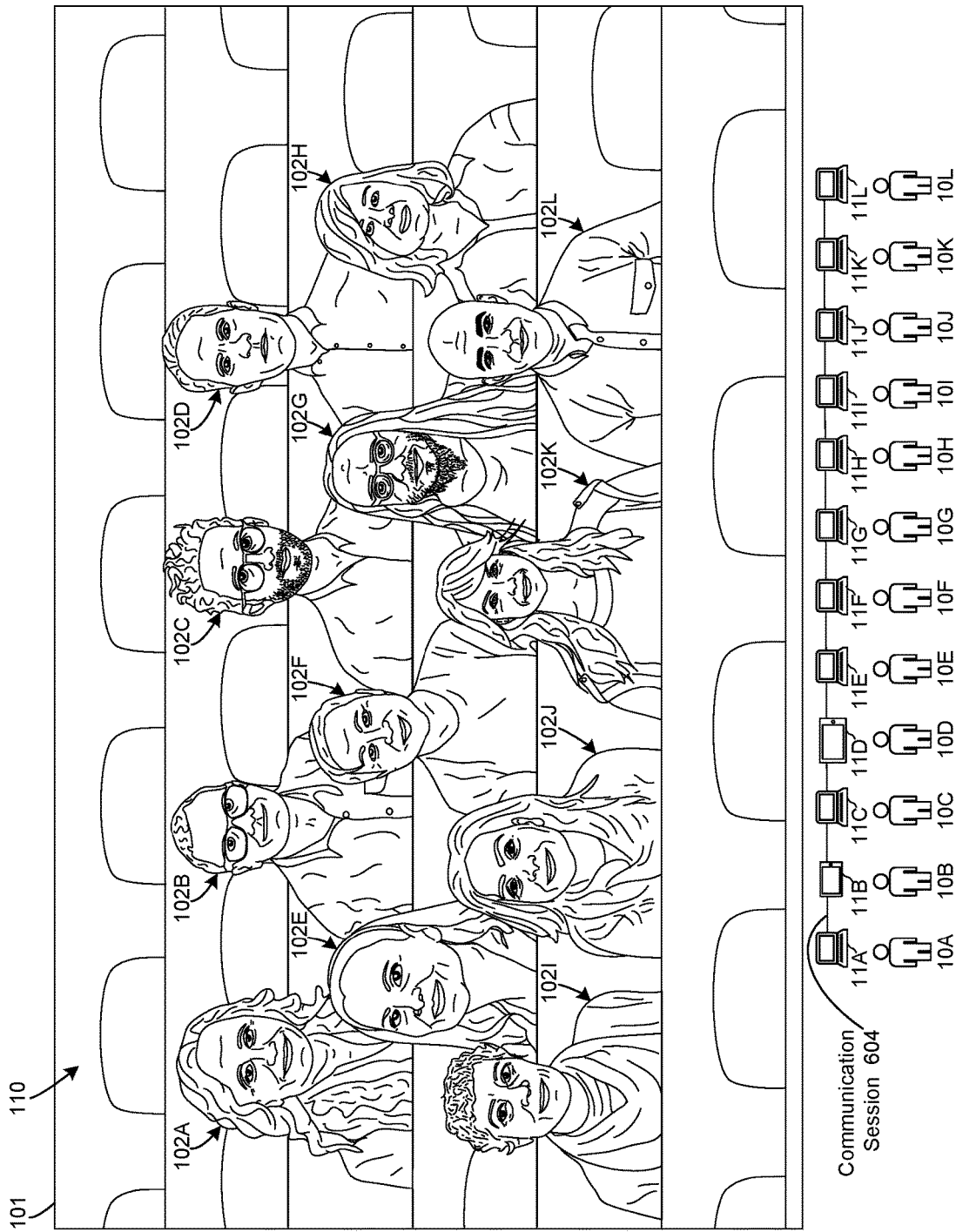
FIG. 1 shows aspects of a Together Mode user interface configured to display renderings of participants of a communication session.

The techniques disclosed herein provide systems for optimizing the use of computing resources and to improve user engagement by the introduction of visual indicators that provide user awareness of independent activity of participants in a communication session. The techniques disclosed herein utilize a Together Mode user interface that can reduce fatigue and promote user engagement. The disclosed techniques address a number of technical problems. For example, the disclosed techniques address inefficiencies and problems that are encountered in existing communication systems that utilize box grid user interface arrangements for displaying individual renderings participants of a video conference.

The display of video streams in traditional box grid formats make it difficult for participants to interpret many non-verbal social cues during a video conference. These types of gestures are used during in-person meetings to guide various types of interactions. There are a number of different types of non-verbal social cues such as head nods, facial cues, body language, etc. These non-verbal social cues communicate many different emotions and intentions. For instance, non-verbal social cues can show that a person has an issue, or that a person wants to speak, or that a person agrees or does not agree. In some cases, non-verbal social cues are so automatic that audience members can even synchronize their breathing pattern to a speaker's breathing pattern. During an in-person meeting, people are constantly interpreting others' eye movements, posture, how their heads are tilted and more, and attributing meaning to those non-verbal cues. But on a video call using a traditional user interface with a grid arrangement, those movements aren't diagnostic, meaning they're not providing accurate information about what's going on. Such shortcomings of existing systems can lead to user fatigue and often lead to a user becoming disengaged.

The Together Mode features disclosed herein provide a number of benefits, e.g., technical effects, that help each participant of a virtual meeting communicate non-verbal social cues. For instance, a Together Mode user interface is configured to give participants of a video conference the impression that everyone is looking at the entire group in a big virtual mirror. When using the Together Mode user interface, participants of a video conference can look at one another, and readily communicate may different types of non-verbal social cues, e.g., look in the direction of one another, lean into one another, etc.

The Together Mode user interface changes the whole user experience compared to the traditional box grid user interface arrangement. This is possible because a person's brain is used to being aware of others based on their location, and the Together Mode user interface is designed to manage the location of the user renderings. The way in which people are positioned in the Together Mode user interface can help make it easier for everyone to see non-verbal social cues and tell how they are responding to each other. The Together Mode UI enables participants to utilize social and spatial awareness mechanisms in the brain. This enables a participant's brain to function more naturally and provide a richer user experience that does not cause fatigue. When viewing a video conference through the Together Mode UI, users can practice some of the natural social signaling they would do in real life, e.g., social signaling that may occur during in-person meetings.

In another example of a technical effect of the present disclosure, the Together Mode UI enables users to maintain eye contact. This helps with a known issue with some existing grid-based video conferencing systems that have issues with gaze misalignment. While video conferencing systems have grown more robust and stable over the decades, there have been no real improvements to the user experience that were viable for widespread use. The grid format has fundamentally been the same over the years and such formats have been known to cause video-call fatigue. For example, if someone's face looms large in a person's visual sphere in real life, it generally causes a person to trigger a fight or flight response. In this state, that person is alert and hyper-aware, which causes amplified reactions that are automatic and subconscious, and that person's heart rate can be unnecessarily elevated. In video calls, there's often a grid with multiple faces filling the boxes, some that may be scaled at disproportionate sizes. In those traditional user interface arrangements, that user experience can be overwhelming for a person's nervous system to handle.

The Together Mode user interface can provide added context to user gestures that enables more effective communication by positioning renderings of individuals within a virtual environment and maintaining positions of renderings of each user. For example, when users know that they are positioned next to a person within a seating arrangement, head movements have actual meaning to each person. Gestures and subtle movements of each person have an in-person meeting feel and movements do not create the confusion that occurs in traditional grid format UI's. In some configurations, the Together Mode user interface can involve a process for scaling the renderings of individuals to help give the appearance that everyone is the same room. These features can help a system cause less confusion and also help reduce fatigue. These benefits can help make a user's interaction with a computer more accurate and realistic, while providing more effective communication between users.

The Together Mode UI also enables users to readily locate individuals and interpret non-verbal social cues using natural cognitive brain functions. Such features can mitigate user fatigue and promote user engagement, as participants of a communication session are less likely to miss salient information and reduce the need for users to refer to recordings, alternative communication methods, or prolong meetings, all of which can lead to inefficient use of computing resources. The benefits of the Together Mode features can mitigate the need for redundant use of network, processor, memory, or other computing resources.

These benefits can also reduce the likelihood of inadvertent user inputs and other errors that may result when a user has to review recordings or communicate with others when salient information is missed due to a lack of user engagement. When a participant of a video conference misses salient information due to a lack of user engagement, a system may be required to retrieve, communicate, and process multiple copies of information.

The disclose techniques also address the deficiencies of existing systems by providing a visual indicator that can help bring additional context to non-verbal social cues that may be performed by a user interacting with a computing device. The visual indicator can be generated in response to detecting that the user is interacting with an input device, such as a keyboard or touchscreen. Thus, when a user is looking down at their computing device and typing on a keyboard, the system may generate a visual indicator that provides a notification to participants positioned below the user in the virtual mirror. The visual indicator can be graphically configured to indicate that the user is interacting with a computing device and not looking in the direction of the participants positioned below the user. This type of visual indicator can help mitigate confusion with respect to some non-verbal social cues, e.g., when a meeting participant appears to be looking at another participant of a meeting but is actually looking at, and interacting with, a computing device.

Referring now to FIG. 1, aspects of a Together Mode user interface are shown and described below. For illustrative purposes, the Together Mode user interface is also referred to herein as a "communication session user interface 101." In this example, individual computing devices 11 participating in a communication session 604A each display of a communication session user interface 101 comprising individual renderings 102A-102L of the video streams of a plurality of participants 10A-10L respectively operating individual computing devices 11A-11L. In this example, the individual renderings 102A-102L each have a position relative to a seating configuration of a virtual environment 110. This example is provided for illustrative purposes and is not to be construed as limiting. The virtual environment 110 can portray any type of environment such as an office, meeting room, auditorium, stadium, etc. The user interface shown in FIG. 1 can be generated for display at any one of the devices and can display any number of participants.

In some configurations, the Together Mode user interface provides the same view for each person in a meeting and the seating arrangement for the participants does not change over time. More specifically, the arrangement of the user renderings, e.g., the order of, and spacing between, the renderings are the same across each device. This is unlike some traditional grid views that show participants' videos in different locations on each person's screen and that move the boxes around during the call based on who's speaking or who joins or leaves a meeting. Since an area of the brain is devoted to spatial memory, Together Mode's consistency provides a number of benefits to reduce the cognitive load and fatigue to each user of a video conference.

Together Mode involves a user interface arrangement that gives participants of a communication session a feeling that they are in the same room. In general, when an application enables Together Mode, the application generates a user interface that arranges the participants of a communication session in one shared space. In some configurations, images of each participant can be arranged according to a seating arrangement of a virtual environment. This user interface arrangement enables each participant to feel more connected to the other participants. This user interface arrangement can be used for meetings, coffee breaks, corporate all-hands meetings, sporting events, or any other type of get together.

In some configurations, the individual renderings 102 of each participant 10 are generated using a conforming crop filter that removes any component of an image that includes a background from a participant's surrounding environment. Each video stream generated by a camera at a participant's device 11 is received and processed to produce a rendering 102 that is shaped according to the image of the user and any accessories that the user may be wearing, such as a hat, jewelry, etc. Thus, when the shaped image of the participant is positioned over an image of a virtual environment, the system can give the appearance that the participant is in the virtual environment with other participants of a communication session. These shaped renderings 102 allow viewers to focus on the depicted person without the distraction of an image of their physical surroundings.

The size of each rendering 102 of the participants may also be normalized to give the appearance that the participants are in the same room. In some examples, the renderings 102 can be resized or scaled within a threshold size difference of one another, or the renderings 102 can be resized or scaled according to predetermined dimensions suited for a particular virtual environment. For a group meeting, for example, each rendering of each participant can be scaled to fit depicted seats, desks, etc. These adjustments enable a system to give the appearance that each person is sitting together within a given setting, e.g., an office, meeting room, stadium, etc. These features are an advancement over the traditional user interface arrangements that only have a grid of boxes. The Together Mode features help create an environment that has a profound impact on the feel of a video conference.

Figure 2:
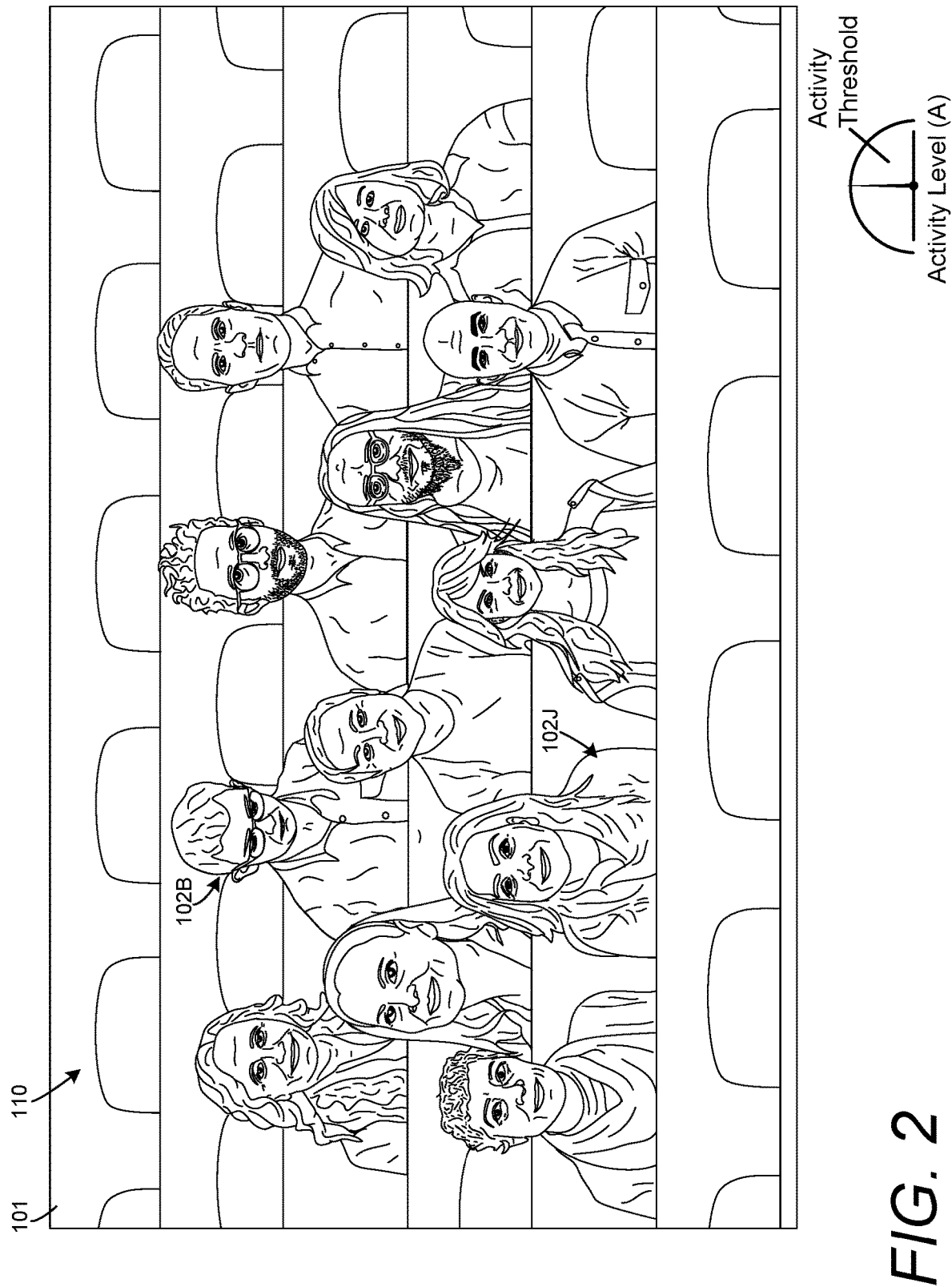
FIG. 2 shows aspects of a Together Mode user interface configured to display renderings of participants of a communication session where one participant is looking in a particular direction.

FIG. 2 shows a user scenario where the second rendering 102B gives the appearance that the second user 10B is looking at other users, e.g., the second user 10B is looking at the tenth user 10J, who is displayed as the tenth rendering 102J. When this scenario is displayed, the tenth user 10J and other users may interpret the action of the second user 10B as a non-verbal social cue that is directed to the tenth user. However, in a situation where the second user 10B is looking down while typing on a keyboard and not intentionally looking in the direction of the tenth user 10J, the perception of this action may be inaccurate, which can cause confusion and inefficiencies with respect to computing resources. In some cases, such a scenario can cause user fatigue since viewers will view and mentally process a number of non-verbal social cues that do not follow the intentions of the people performing the non-verbal social cues.

To address the aforementioned issues and other problems, the system can be configured to monitor activity of a user's input device, such as a keyboard or touchscreen. If input data received from the input device exceeds a threshold or meets one or more criteria, the system may generate a visual indicator configured to convey the intention of the user. For example, if the user is intending to interact with a computing device and not intending to interact with another person, the system can monitor characteristics or a pattern of input interactions indicating that user intent.

In some examples, a visual indicator can be displayed in the user interface 101 in response to the detection of input data indicating a key entry rate or a total number of key entries within a time period exceeds a threshold. In another example, a visual indicator can be displayed in the user interface 101 in response to the detection of input data indicating key entries for a predetermined time period. This helps provide a filter for false-positive indicators, e.g., the visual indicator will not be displayed when the user enters a few keys or performs an action that is consistent with the context of the visual indicator. However, if the user provides input entries above a particular rate, reaches a threshold input entry count, or makes entries for a predetermined time, the system can generate a visual indicator. An input entry can include any type of input gesture, a tap or swipe on a touchscreen, a key input on a keyboard, etc. In the example shown in FIG. 2, an activity level (A) is shown to be below a threshold. The activity level (A) can be any metric of a user's interaction with an input device. Thus, in this scenario, the system does not generate a visual indicator.

Figure 3:
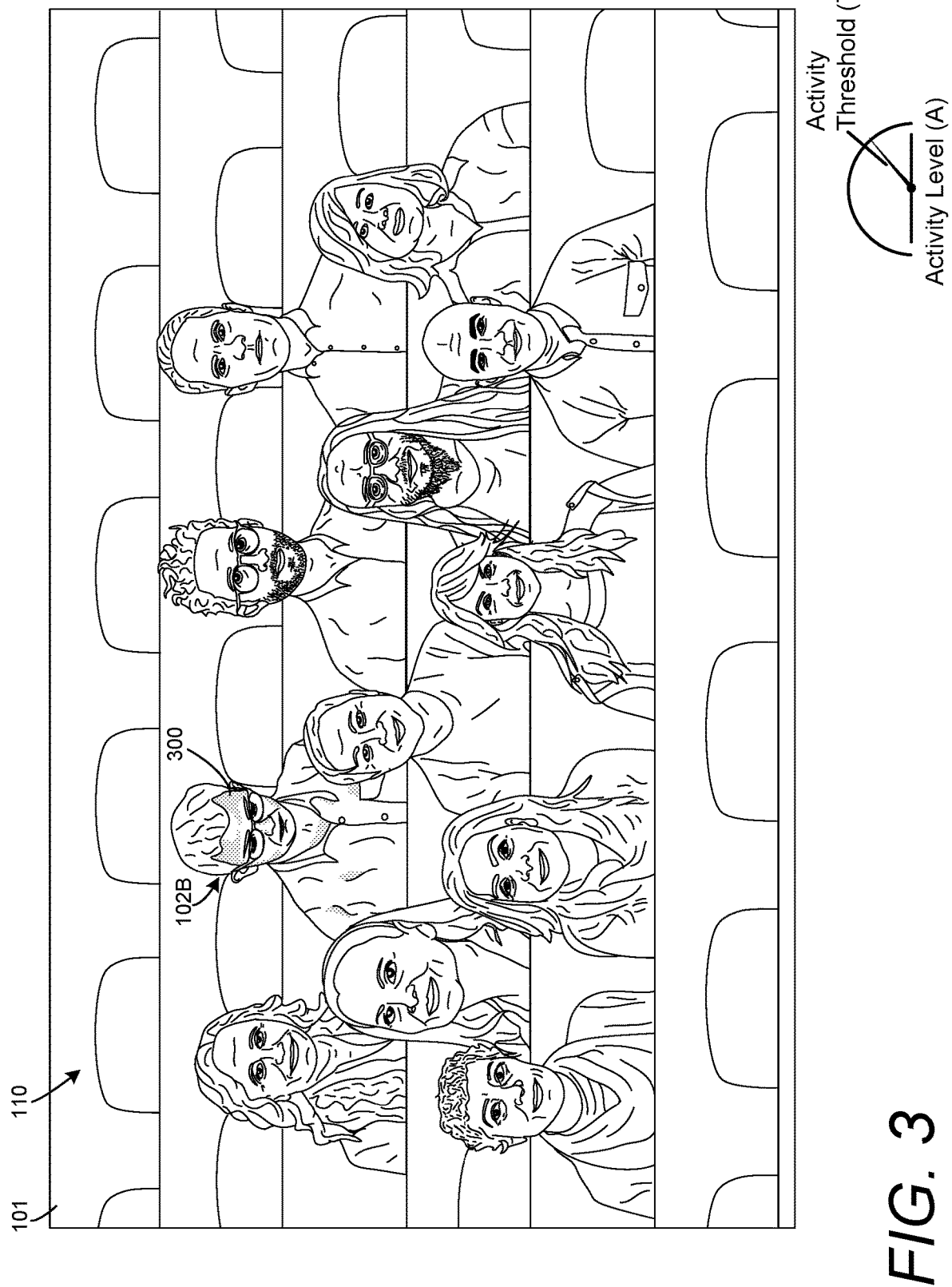
FIG. 3 shows aspects of a Together Mode user interface configured to display renderings of participants and a visual indicator for providing awareness of independent activity of a participant, where the visual indicator is displayed in association with a threshold level of user activity with an input device.

FIG. 3 shows another user scenario where the system detects user activity with an input device that is above a predetermined threshold. In this example, input data indicates an activity level (A) from an input device from the second user is above a predetermined threshold. In response, the system can generate a visual indicator 300 that indicates independent activity of the second user interacting with an input device generating the input data. In general, the visual indicator 300 can be graphically configured to indicate that a user, such as the second user, is interacting with a computing device and not looking in the direction of a participant within the viewing area.

The visual indicator 300 can be any type of computer-generated graphical element suitable for indicating a user's interaction with a computing device. For example, the computer-generated graphical element can include a shading, light source, generation of an object, or the type of computer-generated graphical element can include modifying a display property, e.g., contrast, brightness, or color, of a rendering in the user interface. In some configurations, such as the example shown in FIG. 3, the visual indicator can be in the form of a light that appears to be emanating from a location of the user's personal computing device. The visual indicator can be a faint glow that stimulates a lighted keyboard or a mobile device. The visual indicator can be formed to appear as if light emanating from a keyboard is reflecting off of the user, such as regions of illuminated areas and shaded areas on the user's face and/or clothing. Such embodiments can be subtle enough that it does not disrupt the flow of a meeting, yet configured in a way that makes the user's intention more clear as they are interacting with a computer and not interacting with other participants. This type of visual indicator can help mitigate confusion with respect to some non-verbal social cues, e.g., the system can eliminate or mitigate the appearance that the user is looking at another participant in a meeting.

An intensity of the visual indicator 300 can also be based on one or more factors. For instance, a brightness of a light source or a shading level can be based on the activity level (A). In another example, the brightness of a light source or a shading level of a visual indicator 300 can be based on a number of displayed visual indicator 300. For instance, as more users interact with their input devices, the brightness of a light source or the shading level can be reduced or increased.

Figure 4:
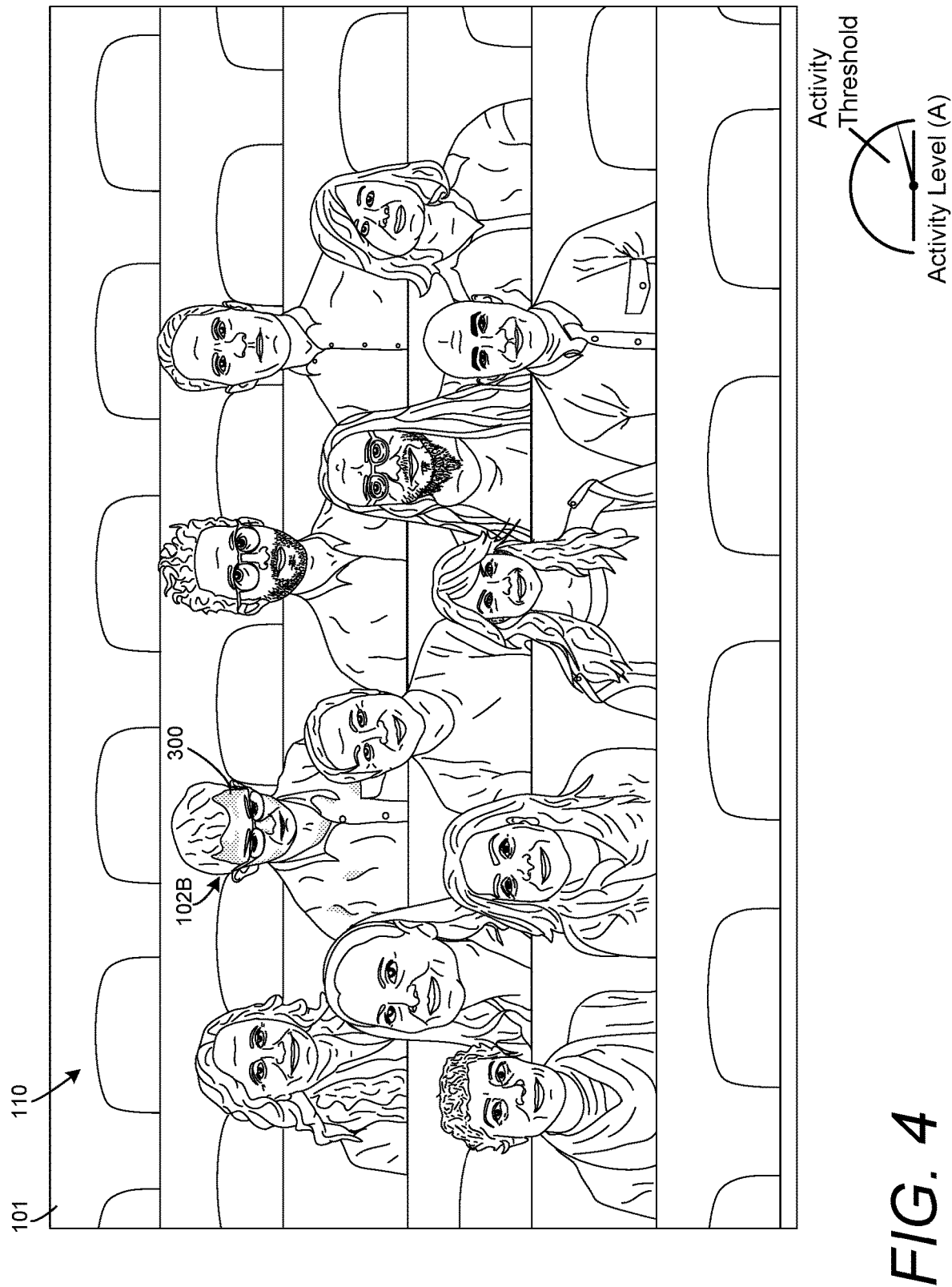
FIG. 4 shows aspects of a Together Mode user interface configured to display renderings of participants and variations to a visual indicator for providing awareness of independent activity of a participant, where variations to the visual indicator are displayed in association with a changed level of user activity with an input device.
Figure 5:
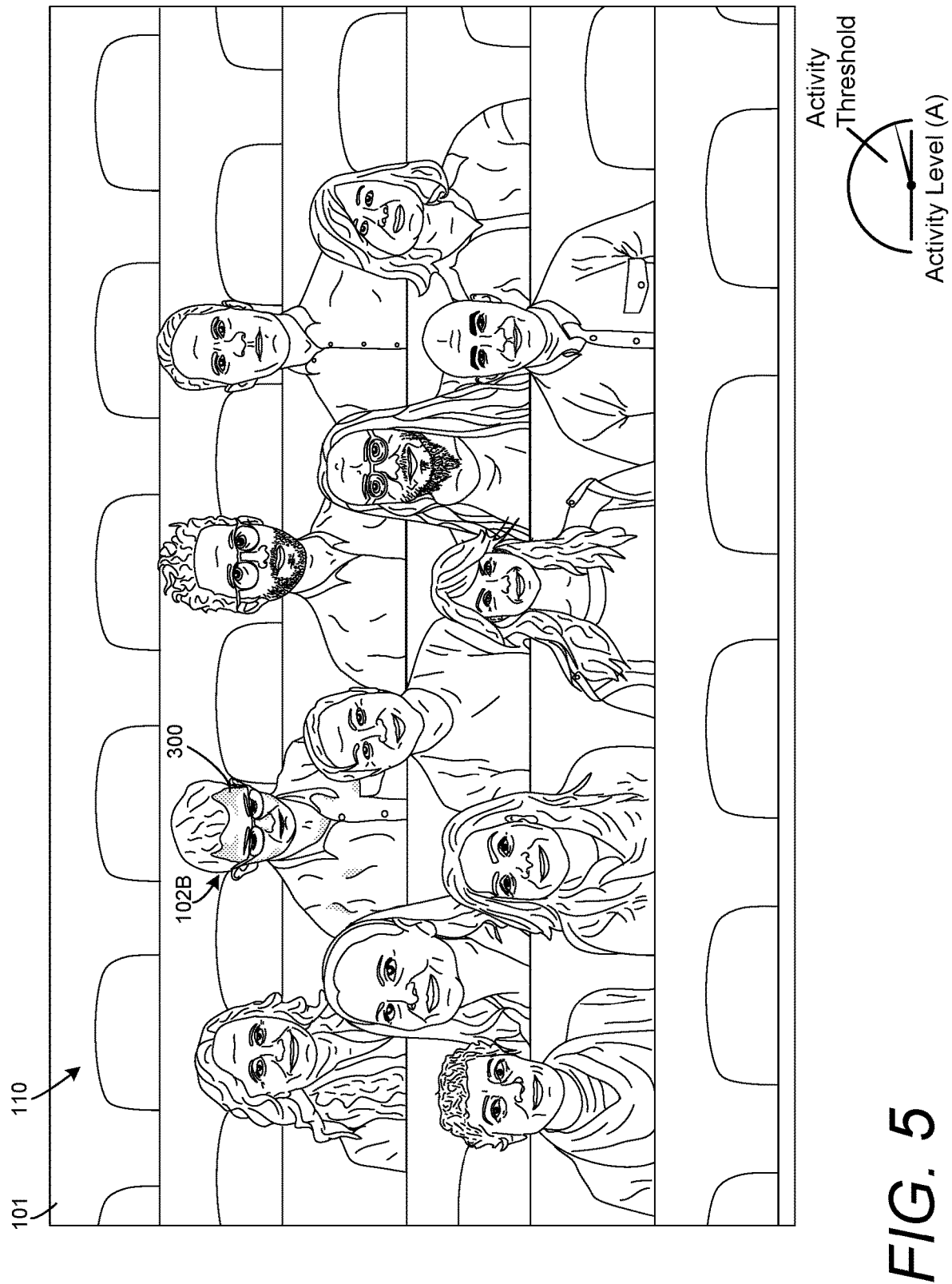
FIG. 5 shows aspects of a Together Mode user interface configured to display renderings of participants and additional variations to a visual indicator for providing awareness of independent activity of a participant, where the additional variations to the visual indicator are displayed in association with a changed level of user activity with an input device.

In some configurations, as shown in the example of FIGS. 3, 4 and 5, a display property of the visual indicator can vary based on one or more factors. In this example, a size and/or shape visual indicator 300 varies based on the activity level. Thus, if a particular user types on the keyboard or interacts with a touchscreen for a predetermined period of time, or if the user types at an increased rate or a decreased rate, the shape and/or size of the visual indicator 300 can change. The visual indicator 300 can cycle between the examples shown in FIGS. 3, 4 and 5, which shows a fluctuation of the size and shape of the visual indicator 300, which can provide a simulation that the user is interacting with a mobile device or a keyboard causing lighting variations from a computer screen or a lighted keyboard. This fluctuation can be subtle yet noticeable enough that users can gain an understanding of the user's intent to engage in independent activity.

The fluctuation of the intensity, size, and/or shape of the visual indicator 300 can vary based on one or more factors. For instance, the intensity, size, and/or shape of the visual indicator 300 in response to a detection that a user is interacting with an input device for a predetermined period of time, or if the interaction has a fluctuation with respect to an key entry rate, or if a type of the interaction changes, e.g., that the user is moving from a digital pen to a keyboard input method. The fluctuation can also be based on a type of content the user is interacting with. For example, the fluctuation may occur or change if the user is watching a movie versus typing a message, or watching content related to the communication session. These examples are provided for illustrative purposes and are not to be construed as limiting. It can be appreciated that any type of modification of the user input or a duration of the user input can cause a change to any type of display property of the visual indicator 300.

Figure 6:
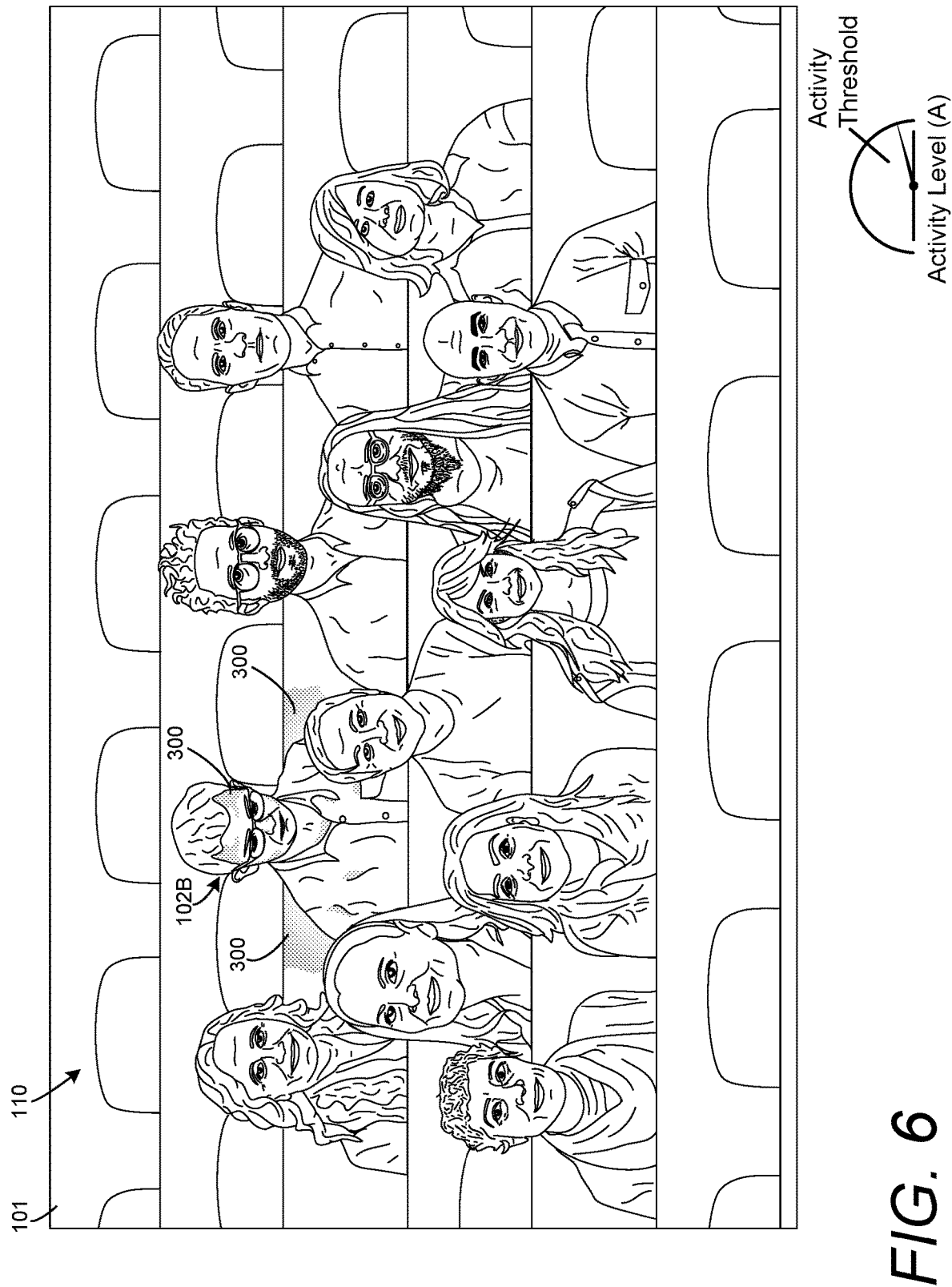
FIG. 6 shows aspects of a Together Mode user interface configured to display renderings of participants and an enhanced visual indicator that is applied to objects surrounding a user, where the enhanced visual indicator is displayed in association with a changed level of user activity with an input device.

The visual indicator 300 can be configured to be displayed within regions that are in proximity to a user interacting with a computing device. For example, the visual indicator 300 can be generated as an overlay over a rendering of the user. In some embodiments the visual indicator 300 can be generated as an overlay over a rendering of the user and also be projected in regions around the user. One example of this embodiment is shown in FIG. 6. In this example, the visual indicator 300 is configured to give the appearance of light reflecting from a background surface that is positioned in within the virtual environment 110. This variation of the visual indicator 300 can occur if the input data meets one or more criteria, such as an input interaction that lasts for a predetermined period of time, or a key entry rate above a threshold, based on a type of content the user is viewing, and/or any other input data indicating a predetermined action of the user or other users.

Figure 7:
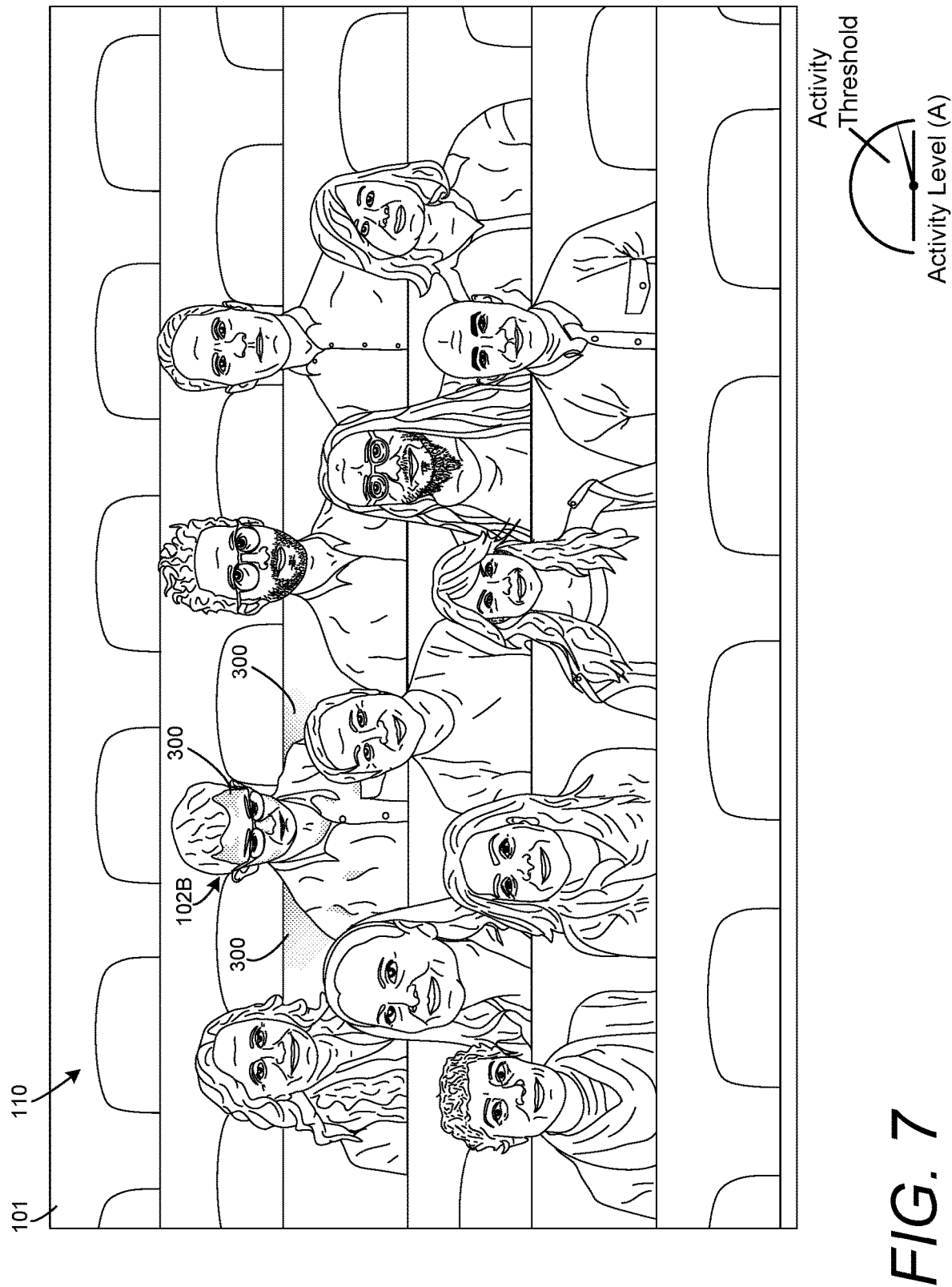
FIG. 7 shows aspects of a Together Mode user interface configured to display renderings of participants and variations to an enhanced visual indicator that is applied to objects surrounding a user, where the variations to the enhanced visual indicator is displayed in association with an increased level of user activity with an input device.

In FIG. 6 and FIG. 7, the intensity, size and/or shape visual indicator 300 that is positioned around the user can vary based on the activity level or other factors disclosed herein. This example of the variation of the visual indicator 300 can also occur based on an activity level satisfying another set of criteria, which can be different than the one or more criteria for displaying the visual indicators 300 shown in FIGS. 3, 4, and 5. Thus, the system can display the visual indicators 300 shown in FIGS. 3, 4, and 5, and then based on the input data meeting a second set of criteria, the system can display the visual indicators 300 shown in FIGS. 6 and 7.

In some embodiments, the intensity, size and/or shape visual indicator 300 can also be reactive to the actions of other users. For instance, if there are a large number of people interacting with their devices, the system may make the visual indicator 300 of each person in a room less prominent so the visual indicator 300 does not change the appearance of an entire meeting. This may eliminate or reduce the prominence of the visual indicator 300 in meetings where everyone is required to type on a keyboard or interact with a personal computer. For example, a system can restrict the display of the visual indicator or reduce a prominence level of one or more visual indicator in a meeting in response to determining that a threshold number of participants of the plurality of participants are interacting with respective input devices at a threshold interaction level. The threshold level can include any metric described herein, e.g., an input entry rate, an input entry duration, an input entry count, etc.

Figure 8:
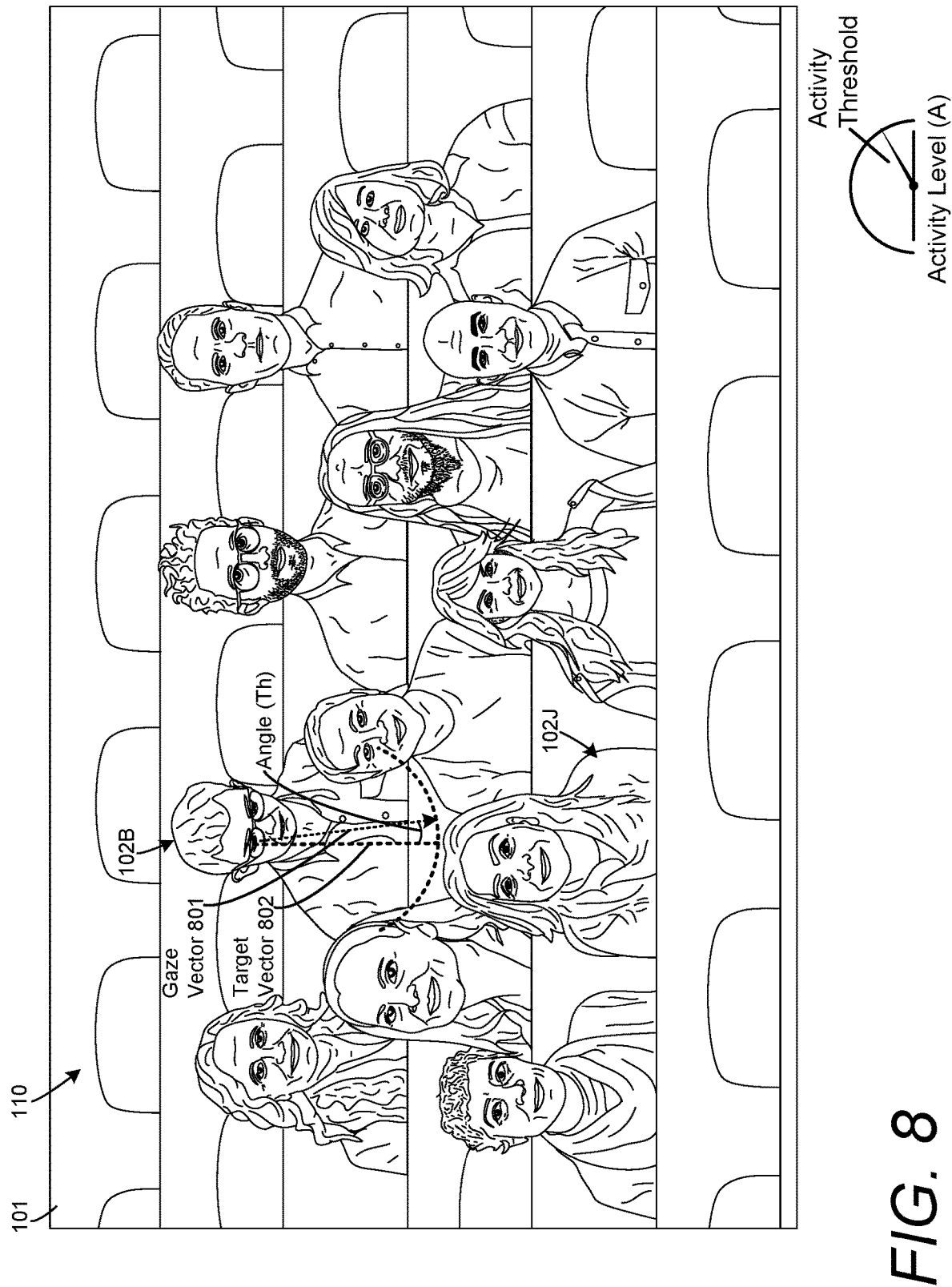
FIG. 8 shows aspects of a rendering of a participant in a Together Mode user interface, where a participant is looking in a direction toward another user.

The visual indicator 300 can be displayed in response to the input data described above and/or in response to detecting that a user is looking in a particular direction. FIG. 8 shows an example where a system can determine if a gaze direction of a user meets one or more criteria, e.g., that the user is looking in a particular direction. In this example, the system can detect that a user, such as the second user 10B (second rendering 102B), is looking toward a predetermined location. In some configurations, the predetermined location can be an area in the virtual environment where a computing device of the user should be located. For example, for the second user 10B, a computing device would be likely positioned below the body or face of the user. Thus, if the user is looking in a downward direction, the system can detect such a gesture and cause the display of the visual indicator 300. Alternatively, the system may cause the display of the visual indicator 300 in response to detecting that input data from an input device meets one or more criteria, and in response to detecting that the user is looking in a predetermined direction.

In some embodiments, the visual indicator 300 can be displayed in response to determining that a gaze vector is within a threshold angle of a target vector. The gaze vector can be generated by a position of the user's head and/or the position of the user's eyes. The system can generate a gaze vector from sensor data defining an image of the user captured by a sensor. Any suitable technology for generating a gaze vector can be used.

The target vector can originate from a predetermined point within a region within the user's face and extend in a downward direction. The target vector can be directed from the predetermined point toward any predetermined direction depending on the user's position, the seating configuration, or a detection of an actual device. For example, based on a user's seating position, e.g., they are facing the camera, the target vector can be directed from the predetermined point toward the user's lap or a desk surface in front of the user. In another example, if a camera detects the position of the user's keyboard, the system may determine that a target vector originates at a point between the user's eyes and extends to the location of the detected input device. One or more sensors can detect a gaze vector based on the position of the user's head and eyes. The visual indicator 300 can be displayed in response to determining that the gaze vector is within a threshold angle (Th) of the target vector.

Any combination of input data and sensor data can be used to cause a display of the notification. In some embodiments, the visual indicator 300 can be displayed in the user interface in response to determining that the input data indicates a threshold level of the interaction between the input device 627 and the participant 10, and/or in response to determining that a gaze vector is within a threshold angle of a target vector. In some embodiments, the visual indicator 300 can be displayed in the user interface in response to determining that the input data meets one or more criteria with respect to a type of input device, such as a keyboard or tablet, that the input data indicates a threshold level of user activity, and/or and in response to determining that a gaze vector is directed toward a predetermined location or toward a location of an input device.

FIG. 6 is a diagram illustrating aspects of a routine 600 for improving user engagement by generating visual indicators that provide user awareness of independent activity of participants in a communication session. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration.

Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Figure 9:
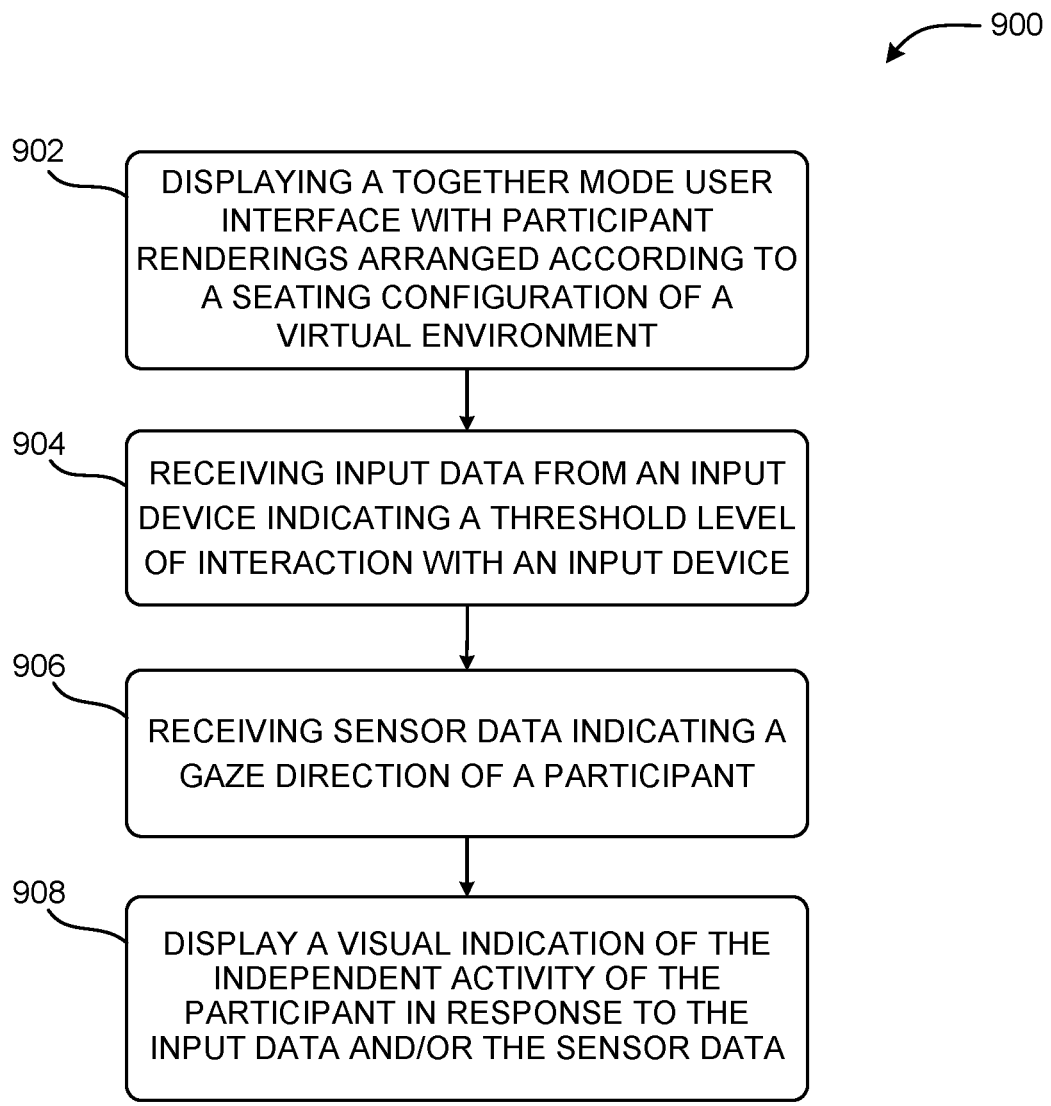
FIG. 9 is a flow diagram showing aspects of a routine for improving user engagement by generating visual indicators that provide user awareness of independent activity of participants in a communication session.

Additionally, the operations illustrated in FIG. 9 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 900 includes an operation 902 where the system causes one or more computing devices to display a user interface 101 comprising individual renderings 102A-102L of the video streams of a plurality of participants 10A-10L on remote computing devices 11A-11L each associated with the plurality of participants 10A-10L. The individual renderings 102A-102L each have a position relative to a rendering of a seating configuration of a virtual environment 110. The system allows the plurality of participants to communicate through a communication session 604. The virtual environment 110 can also include lighting effects to help mitigate lighting anomalies that may result from video streams that are received from separate sources.

The communication session user interface 101, and other user interface arrangements disclosed herein, can be generated by operations for receiving the video streams from the remote computing devices, such as the client devices. The streams can be received by a client device or a server device. The streams can include an image of a person and a background of the person's surrounding environment. The system can apply a processing filter to each of the video streams to remove the background from the image. The system can then conform the video stream such that the video stream can generate a rendering shaped according to the image of the person. The system can also scale the image of each person to a predetermined size for compatibility with the seating configuration of the virtual environment, or to normalize each of the images to give the appearance that each person is in the same room.

Next, at operation 904, the system receives input data from an input device 627 indicating a threshold (Th) level of interaction, e.g., a an activity level (A), between the input device 627 and a participant, such as the second participant 10B, of the plurality of participants 10. The input data can include a rate in which keys are pressed, a total count of a number of keys that are pressed, or a duration related to a particular interaction, e.g., when a key entry rate is above a threshold.

Next, at operation 906, the system can receive sensor data indicating a direction in which a participant, such as the second participant 10B, is looking. Such data can be captures by a camera directed to the participant. Based on a head position and/or a direction of the participant's eyes captured by a sensor, the system can determine a gaze direction of a meeting participant. As described herein, the system can determine if a gaze vector meets one or more criteria and generate a visual indicator 300 if the gaze vector meets and/or other input data one or more criteria.

Next, at operation 908, based on the input data and/or the gaze direction of a participant, the system can display the visual indicator 300 of the independent activity of the participant. In some embodiments, the visual indicator 300 can be displayed in the user interface in response to determining that the input data indicates a threshold level of the interaction between the input device 627 and the participant 10B. In some embodiments, the visual indicator 300 can be displayed in the user interface in response to determining that a gaze vector is within a threshold angle of a target vector. In some embodiments, the visual indicator 300 can be displayed in the user interface in response to determining that the input data indicates a threshold level of the interaction between the input device 627 and the participant 10B, and in response to determining that a gaze vector is within a threshold angle of a target vector. In some configurations, the visual indicator can be in the form of a virtual light source that is configured to appear from a location in the virtual environment. The location can be based on a direction where the user is looking, e.g., based on a gaze vector determine from the participant's gaze direction, or the location of the virtual light source can be based on a projection of where an input device should be positioned based on the participant's position.

The visual indicator 300 can be displayed in a region in proximity to a rendering of a person associated with the input data. For instance, a region can include any area on the rendering of the person, e.g., on the user's face, clothing or on any accessories worn by the user. The region in proximity to a rendering of the person causing generation of the input data or the person that is the subject of the sensor data can also include a display area adjacent to the user's image. For instance, such embodiments can include a visual indicator that is in the form of a light emanating from the person, which can be displayed in a region around the person's head or body. In another example, such embodiments can include a visual indicator that is in the form of a light reflecting from a background surface that is positioned behind the person in the virtual environment, as shown in FIG. 6 and FIG. 7.

In some configurations, operation 908 can include one or more feedback mechanisms where one or more thresholds for criteria could be modified based on user input. For instance, if a user input indicates that a visual indicator is generated too often, the system can modify a threshold or one or more criteria to make the visual indicator for faint or make the visual indicator to appear less frequently. Thus, in response to a user input, the routine 900 may proceed from operation 908 to any other operation and iterate the routine using adjusted thresholds and/or criteria.

The technical effects of the routine and other aspects disclosed herein include reducing the amount of bandwidth and computational cycles used by computing systems that provide a communication session for users. This is achieved by the use of the Together Mode features that provide more cohesion to a user group, which leads to improved interaction between each person and their respective computers. Further, by providing visual indicators notifying participants that a user is engaging in independent activity that is unrelated to a gesture that may be perceived as pertinent to others. This feature can improve user engagement and reduce user fatigue. This can improve the efficacy of a meeting by allowing users to and avoid the need for additional meetings to discuss missed information, emails requesting missed information, a need for a playback of a recording of a meeting, etc. As a result, the disclosed systems and methods can significantly reduce the use of memory, computing cycles, and bandwidth utilization.

Figure 10:
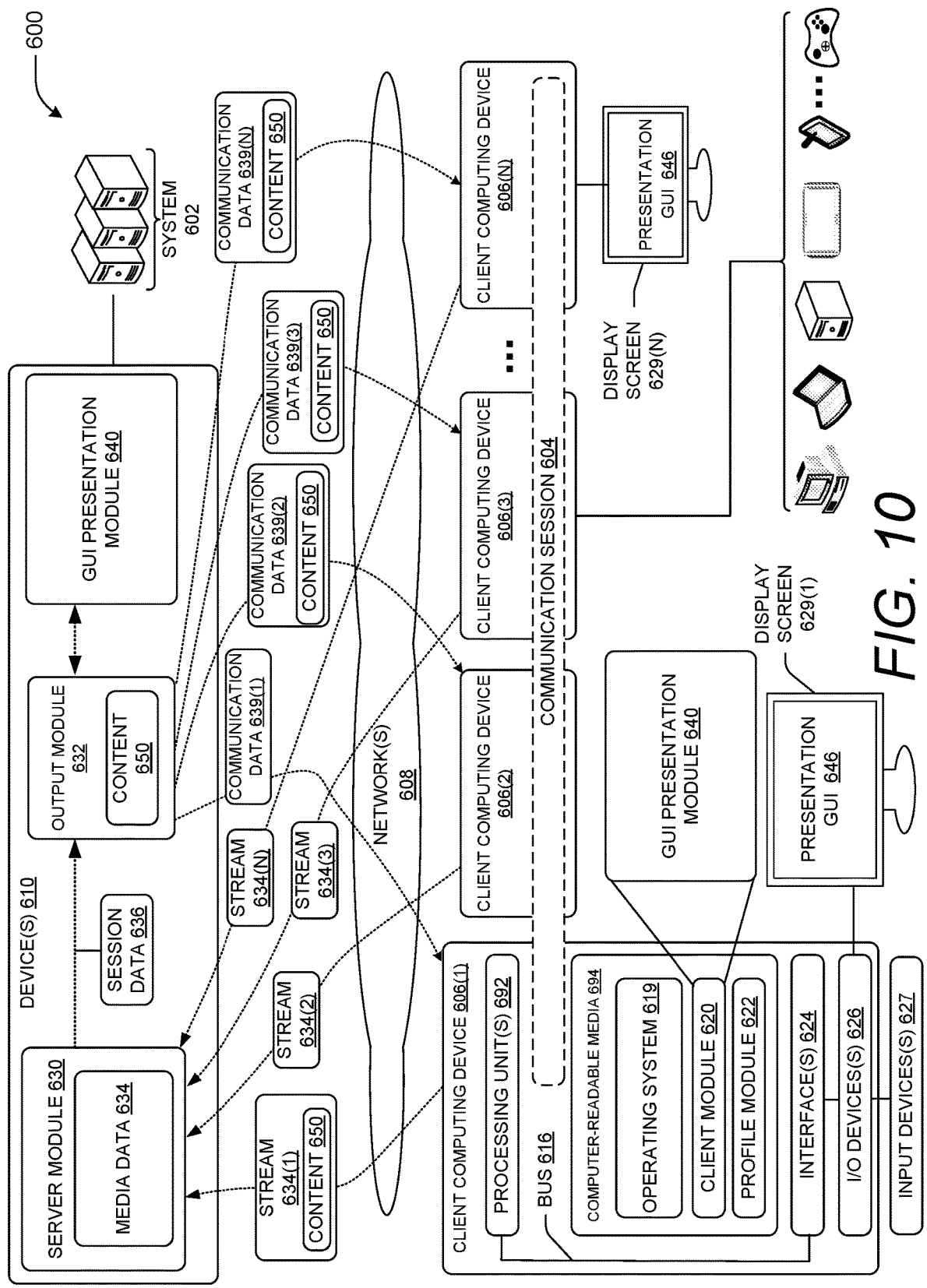
FIG. 10 is a computing system diagram showing aspects of an illustrative operating environment for the techniques disclosed herein.

FIG. 10 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In the examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, the client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 9 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interface 626 that enable communications with user input devices 627 including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). The I/O interface 626, the input device 627, or other components of the system can also be configured with software and hardware for determine a rate of an input, e.g., a key entry rate, a duration of a key entry, etc. The input data from the input device 627 and/or the sensor data from a sensor, e.g., camera (722 from FIG. 11) can be included in the content data 650 communicated to any computer for analysis and processing. FIG. 10 illustrates that client computing device 606(1) is also connected to a display device (e.g., a display screen 629(1-N)), which can display a UI according to the techniques described herein.

In the example environment 600 of FIG. 10, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 10) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 10, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The content 650 can also include input data from an input device from a keyboard or touch surface. The input data can also indicate a rate in which keys are pressed or a duration that indicates how long a person has been interacting with an input device, such as a keyboard. The streams 634 can include a video component depicting images captured by an I/O device 626 on each client computer.

To facilitate aspects of the present disclosure, any system can gather input data from any particular computer. In one illustrative example, the system 602 can gather input data indicating a key entry rate or any other pattern of input from any one of the client computing devices 606. The input data can be a part of the content 650 or other data communicated between the devices. Any one of the computers can be utilized to monitor the input data to determine if a particular performance metric with respect to an input device, e.g., a key entry rate, exceeds a threshold. When the data indicates performance metric that meets or exceeds a threshold, you want more computers and cause the display of a visual indicator providing notice of independent activity of any user.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 11:
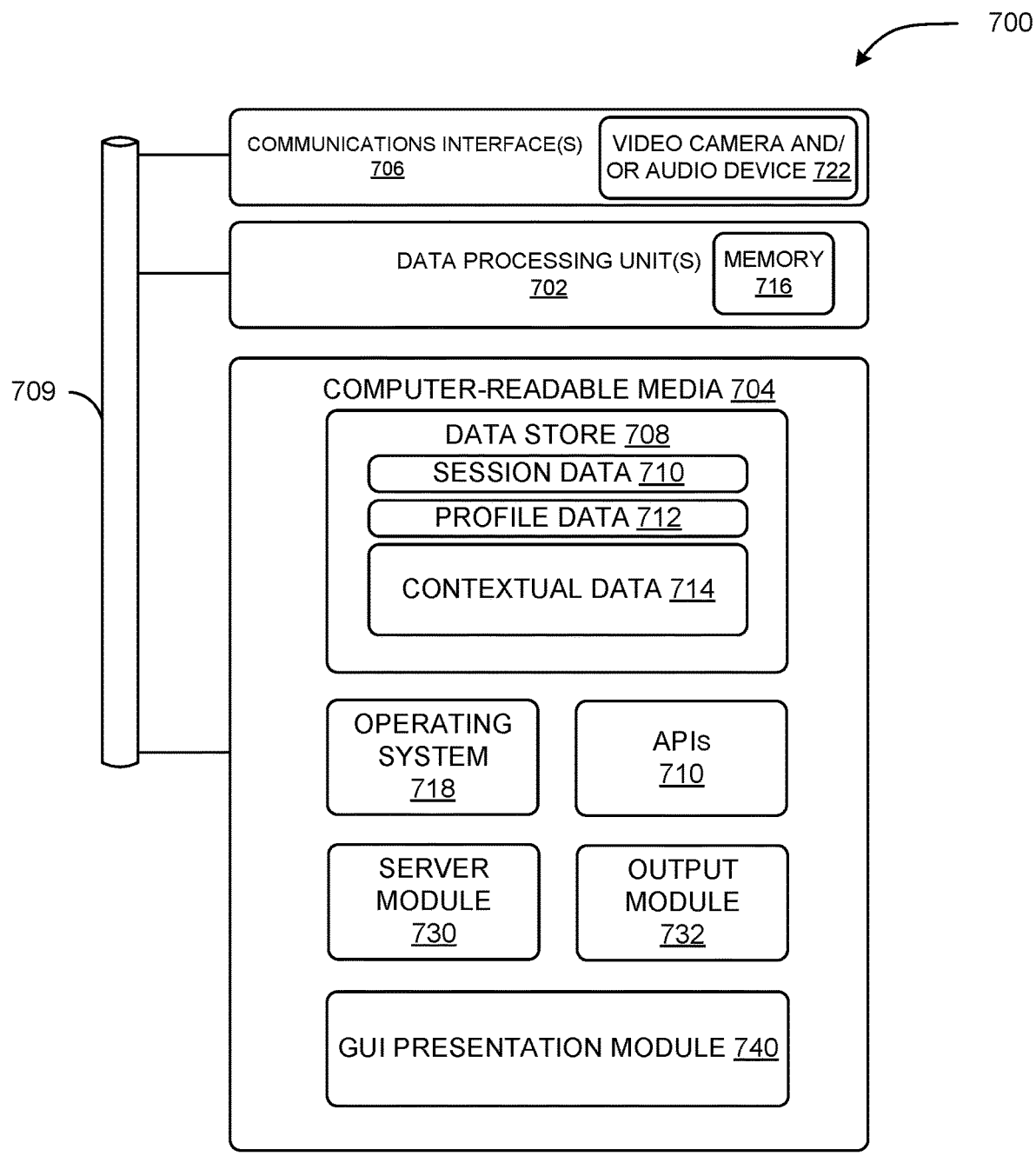
FIG. 11 is a computing architecture diagram showing aspects of the configuration and operation of a computing device that can implement aspects of the techniques disclosed herein.

FIG. 11 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 7), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

The following clauses are to supplement the present disclosure.

Example Clause 1. A method for generating a visual indicator (300) for providing awareness of independent activity of a participant (10B) of a plurality of participants (10) sharing video streams (634) through a communication session (604), the method for execution on a computing system (600) comprising: causing a display of a user interface (101) comprising individual renderings (102) of the video streams (634) of the plurality of participants (10), wherein the individual renderings (102) of the individual participants (10) each have a position relative to a seating configuration of a virtual environment (110); receiving input data from an input device (627) indicating a threshold (Th) level (A) of interaction between the input device (627) and the participant (10B) of the plurality of participants (10); and in response to determining that the input data indicates the threshold (Th) level (A) of the interaction between the input device (627) and the participant (10B), causing a display the visual indicator (300) for providing awareness of the independent activity of the participant (10B), wherein the visual indicator (300) comprises a modification of a display property within a region in proximity to a rendering (102B) of the participant (10B) within the virtual environment (110).

Example Clause 2. The method of clause 1, wherein the modification of the display property of the visual indicator includes a display of a graphical element configured to appear as a light emanating from a location of the input device within the virtual environment.

Example Clause 3. The method of clauses 1 and 2, wherein the graphical element is configured to appear as the light reflecting from the rendering of the participant.

Example Clause 4. The method of clauses 1-3, wherein the modification of the display property includes a display of a graphical element configured with at least one of a fluctuating brightness level, a fluctuating size, or a fluctuating shape within the region.

Example Clause 5. The method of clauses 1-4, wherein the display of the visual indicator is further based on receiving sensor data indicating that a gaze direction of the participant is in a predetermined direction.

Example Clause 6. The method of clauses 1-5, wherein the threshold level of interaction between the input device and the participant comprises a duration for user input entries and a time threshold, wherein the visual indicator is displayed in response to determining that the duration for user input entries exceeds the time threshold.

Example Clause 7. The method of clauses 1-6, wherein the threshold level of interaction between the input device and the participant comprises a input entry count and a threshold count, wherein the visual indicator is displayed in response to determining that the character entry count exceeds the threshold count.

Example Clause 8. The method of clauses 1-7, wherein the threshold level of interaction between the input device and the participant comprises an input entry rate and a threshold rate, wherein the visual indicator is displayed in response to determining that the character entry rate exceeds the threshold rate.

Example Clause 9. The method of clauses 1-8, wherein the display of the visual indicator is restricted or a prominence level of the visual indicator is reduced in response to determining that a threshold number of participants of the plurality of participants are interacting with respective input devices at a threshold interaction level.

Example Clause 10. A system (700) for generating a visual indicator (300) for providing awareness of independent activity of a participant (10B) of a plurality of participants (10) sharing video streams (634) through a communication session (604), the system (700) comprising: one or more processing units (702); and a computer-readable storage medium (704) having encoded thereon computer-executable instructions to cause the one or more processing units (702) to: cause a display of a user interface (101) comprising individual renderings (102) of the video streams (634) of the plurality of participants (10), wherein the individual renderings (102) of the individual participants (10) each have a position relative to a seating configuration of a virtual environment (110); receive input data from an input device (627) indicating a threshold (Th) level (A) of interaction between the input device (627) and the participant (10B) of the plurality of participants (10); and in response to determining that the input data indicates the threshold (Th) level (A) of the interaction between the input device (627) and the participant (10B), cause a display the visual indicator (300) of the independent activity of the participant (10B), wherein the visual indicator (300) comprises a modification of a display property within a region in proximity to a rendering (102B) of the participant (10B) within the virtual environment (110).

Example Clause 11. The system of clause 10, wherein the modification of the display property includes a display of a graphical element configured to appear as a light emanating from a location of the input device within the virtual environment wherein the graphical element is configured to appear as the light reflecting from the rendering of the participant.

Example Clause 12. The system of clauses 10 and 11 wherein the computer-executable instructions further cause the one or more processing units to receive sensor data indicating a gaze direction of the participant, wherein the display the visual indicator is in response to determining that the gaze direction of the participant is in a predetermined direction.

Example Clause 13. The system of clauses 10-12, wherein the individual renderings are generated by: receiving the video streams from remote computing devices of the plurality of participants, wherein the video streams each comprise an image of a person and a physical background physically positioned behind the person; applying a processing filter to each of the video streams to remove a component of the image showing the physical background from the image and configuring the video stream to enable a generation of a rendering of the person shaped according to the image of the person; and scaling the image of the person within the rendering of the person a predetermined size for compatibility with the seating configuration of the virtual environment.

Example Clause 14. The system of clauses 10-13, wherein the display of the visual indicator is further based on receiving sensor data indicating a gaze direction of the participant is in a predetermined direction.

Example Clause 15. The system of clauses 10-14, wherein the threshold level of interaction between the input device and the participant comprises a character entry rate and a threshold rate, wherein the visual indicator is displayed in response to determining that the character entry rate is at a threshold rate.

Example Clause 16. A system (700) for generating a visual indicator (300) for providing awareness of independent activity of a participant (10B) of a plurality of participants (10) sharing video streams (634) through a communication session (604), the system (700) comprising: means for causing a display of a user interface (101) comprising individual renderings (102) of the video streams (634) of the plurality of participants (10), wherein the individual renderings (102) of the individual participants (10) each have a position relative to a seating configuration of a virtual environment (110); means for receiving input data from an input device (627) indicating a threshold (Th) level (A) of interaction between the input device (627) and the participant (10B) of the plurality of participants (10); and means for causing a display the visual indicator (300) of the independent activity of the participant (10B), wherein the visual indicator (300) comprises a modification of a display property within a region in proximity to a rendering (102B) of the participant (10B) within the virtual environment (110), wherein the display of the visual indicator (300) is in response to determining that the input data indicates the threshold (Th) level (A) of the interaction between the input device (627) and the participant (10B).

Example Clause 17. The system of clause 16, wherein the modification of the display property includes a display of a graphical element configured to appear as a light emanating from a location of the input device within the virtual environment wherein the graphical element is configured to appear as the light reflecting from the rendering of the participant.

Example Clause 18. The system of clauses 16 and 17, wherein the computer-executable instructions further cause the one or more processing units to receive sensor data indicating a gaze direction of the participant, wherein the display the visual indicator is in response to determining that the gaze direction of the participant is in a predetermined direction.

Example Clause 19. The system of clauses 16-18, wherein the modification of the display property includes a display of a graphical element configured to appear as a light having at least one of a fluctuating brightness level, a fluctuating size, or a fluctuating shape within the region.

Example Clause 20. The system of clauses 16-19, wherein the display of the visual indicator is further based on receiving sensor data indicating that a gaze direction of the participant is in a predetermined direction.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

I claim:

1. A method for generating a visual indicator for providing awareness of independent activity of a participant of a plurality of participants sharing video streams through a communication session, the method for execution on a computing system comprising:
  causing a display of a user interface comprising individual renderings of the video streams of the plurality of participants, wherein the individual renderings of the individual participants each have a position relative to a seating configuration of a virtual environment;
  monitoring input data to determine if the participant of the plurality of participants has a threshold (Th) level (A) of interaction with the input device, the monitoring of the input data controlling a display of a visual indicator that provides awareness of the independent activity within the seating configuration between the participant and the input device; and
  in response to determining that the input data indicates the threshold (Th) level (A) of the interaction between the input device and the participant, causing the display the visual indicator for providing awareness of the independent activity of the participant, wherein the visual indicator comprises a modification of a display property within a region in proximity to a rendering of the participant within the seating configuration of the virtual environment.

2. The method of claim 1, wherein the graphical element is configured to appear as the light reflecting from the rendering of the participant.

3. The method of claim 1, wherein the modification of the display property includes a display of a graphical element configured with at least one of a fluctuating brightness level, a fluctuating size, or a fluctuating shape within the region.

4. The method of claim 1, wherein the display of the visual indicator is further based on receiving sensor data indicating that a gaze direction of the participant is in a predetermined direction.

5. The method of claim 1, wherein the threshold level of interaction between the input device and the participant comprises a duration for user input entries and a time threshold, wherein the visual indicator is displayed in response to determining that the duration for user input entries exceeds the time threshold.

6. The method of claim 1, wherein the threshold level of interaction between the input device and the participant comprises a input entry count and a threshold count, wherein the visual indicator is displayed in response to determining that the character entry count exceeds the threshold count.

7. The method of claim 1, wherein the threshold level of interaction between the input device and the participant comprises an input entry rate and a threshold rate, wherein the visual indicator is displayed in response to determining that the character entry rate exceeds the threshold rate.

8. The method of claim 1, wherein the display of the visual indicator is restricted or a prominence level of the visual indicator is reduced in response to determining that a threshold number of participants of the plurality of participants are interacting with respective input devices at a threshold interaction level.

9. A system for generating a visual indicator for providing awareness of independent activity of a participant of a plurality of participants sharing video streams through a communication session, the system comprising:
one or more processing units; and
a computer-readable storage medium having encoded thereon computer-executable instructions to cause the one or more processing units to:
cause a display of a user interface comprising individual renderings of the video streams of the plurality of participant, wherein the individual renderings of the individual participants each have a position relative to a seating configuration of a virtual environment;
monitor input data to determine if the participant of the plurality of participants has a threshold (Th) level (A) of interaction with the input device, the monitoring of the input data controlling a display of a visual indicator that provides awareness of the independent activity within the seating configuration between the participant and the input device; and
in response to determining that the input data indicates the threshold (Th) level (A) of the interaction between the input device and the participant, cause the display the visual indicator of the independent activity of the participant, wherein the visual indicator comprises a modification of a display property within a region in proximity to a rendering of the participant within the seating configuration of the virtual environment.

10. The system of claim 9, wherein the modification of the display property includes a display of a graphical element configured to appear as a light emanating from a location of the input device within the virtual environment wherein the graphical element is configured to appear as the light reflecting from the rendering of the participant.

11. The system of claim 9, wherein the computer-executable instructions further cause the one or more processing units to receive sensor data indicating a gaze direction of the participant, wherein the display the visual indicator is in response to determining that the gaze direction of the participant is in a predetermined direction.

12. The system of claim 9, wherein the individual renderings are generated by:
receiving the video streams from remote computing devices of the plurality of participants, wherein the video streams each comprise an image of a person and a physical background physically positioned behind the person;
applying a processing filter to each of the video streams to remove a component of the image showing the physical background from the image and configuring the video stream to enable a generation of a rendering of the person shaped according to the image of the person; and
scaling the image of the person within the rendering of the person a predetermined size for compatibility with the seating configuration of the virtual environment.

13. The system of claim 9, wherein the display of the visual indicator is further based on receiving sensor data indicating that a gaze direction of the participant is in a predetermined direction.

14. The system of claim 9, wherein the threshold level of interaction between the input device and the participant comprises a character entry rate and a threshold rate, wherein the visual indicator is displayed in response to determining that the character entry rate is at a threshold rate.

15. A system for generating a visual indicator for providing awareness of independent activity of a participant of a plurality of participants sharing video streams through a communication session, the system comprising:
means for causing a display of a user interface comprising individual renderings of the video streams of the plurality of participants, wherein the individual renderings of the individual participants each have a position relative to a seating configuration of a virtual environment;
means for monitoring input data to determine if the participant of the plurality of participants has a threshold (Th) level (A) of interaction with the input device, the monitoring of the input data controlling a display of a visual indicator that provides awareness of the independent activity within the seating configuration between the participant and the input device; and
means for causing a display the visual indicator of the independent activity of the participant, wherein the visual indicator comprises a modification of a display property within a region in proximity to a rendering of the participant within the seating configuration of the virtual environment, wherein the display of the visual indicator is in response to determining that the input data indicates the threshold (Th) level (A) of the interaction between the input device and the participant.

16. The system of claim 15, wherein the modification of the display property includes a display of a graphical element configured to appear as a light emanating from a location of the input device within the virtual environment wherein the graphical element is configured to appear as the light reflecting from the rendering of the participant.

17. The system of claim 15, wherein the computer-executable instructions further cause the one or more processing units to receive sensor data indicating a gaze direction of the participant, wherein the display the visual indicator is in response to determining that the gaze direction of the participant is in a predetermined direction.

18. The system of claim 15, wherein the modification of the display property includes a display of a graphical element configured to appear as a light having at least one of a fluctuating brightness level, a fluctuating size, or a fluctuating shape within the region.

19. The system of claim 15, wherein the display of the visual indicator is further based on receiving sensor data indicating that a gaze direction of the participant is in a predetermined direction.

20. The method of claim 1, wherein the input data is monitored during the display of the user interface comprising the rendering of the participant with individual renderings of the individual participants each having respective positions relative to the seating configuration of the virtual environment.

* * * * *